United States Patent [19]

Richardsson

[11] 4,129,222
[45] Dec. 12, 1978

[54] DEVICE FOR EMPTYING CONTAINERS OR SIMILAR

[76] Inventor: Dan Richardsson, Södra Kyrkogatan 5, Lidköping, Sweden, 531 00

[21] Appl. No.: 833,696

[22] Filed: Sep. 15, 1977

[51] Int. Cl.² .............................................. B60P 1/28
[52] U.S. Cl. .................................. 214/17 D; 214/82; 298/1 B
[58] Field of Search ............... 214/82, 510, 514, 17 D; 298/1 B; 222/386, 389, 390

[56] References Cited

FOREIGN PATENT DOCUMENTS

| 462789 | 4/1951 | Italy | 214/82 |
| 505502 | 12/1954 | Italy | 214/82 |

Primary Examiner—Robert G. Sheridan
Attorney, Agent, or Firm—Holman & Stern

[57] ABSTRACT

A device is provided for facilitating the emptying of a container e.g. on a truck loaded with bulk material, which has a tendency of being packed together during the transport. The first and second side walls of the container are pivotally mounted at their upper edges for inward and outward swinging respectively. A movable bottom plate is hingedly connected to the first side wall. The swinging movement is caused by a jack comprising two members, e.g. a cylinder and a piston rod. The first member of the jack is at its end pivotally attached to the bottom of the container at the side thereof and the second member is pivotally attached to the lower edge of the first side wall in such a way that during the outswinging movement of the side walls the second member of the jack makes an obtuse angle with the first side wall.

3 Claims, 7 Drawing Figures

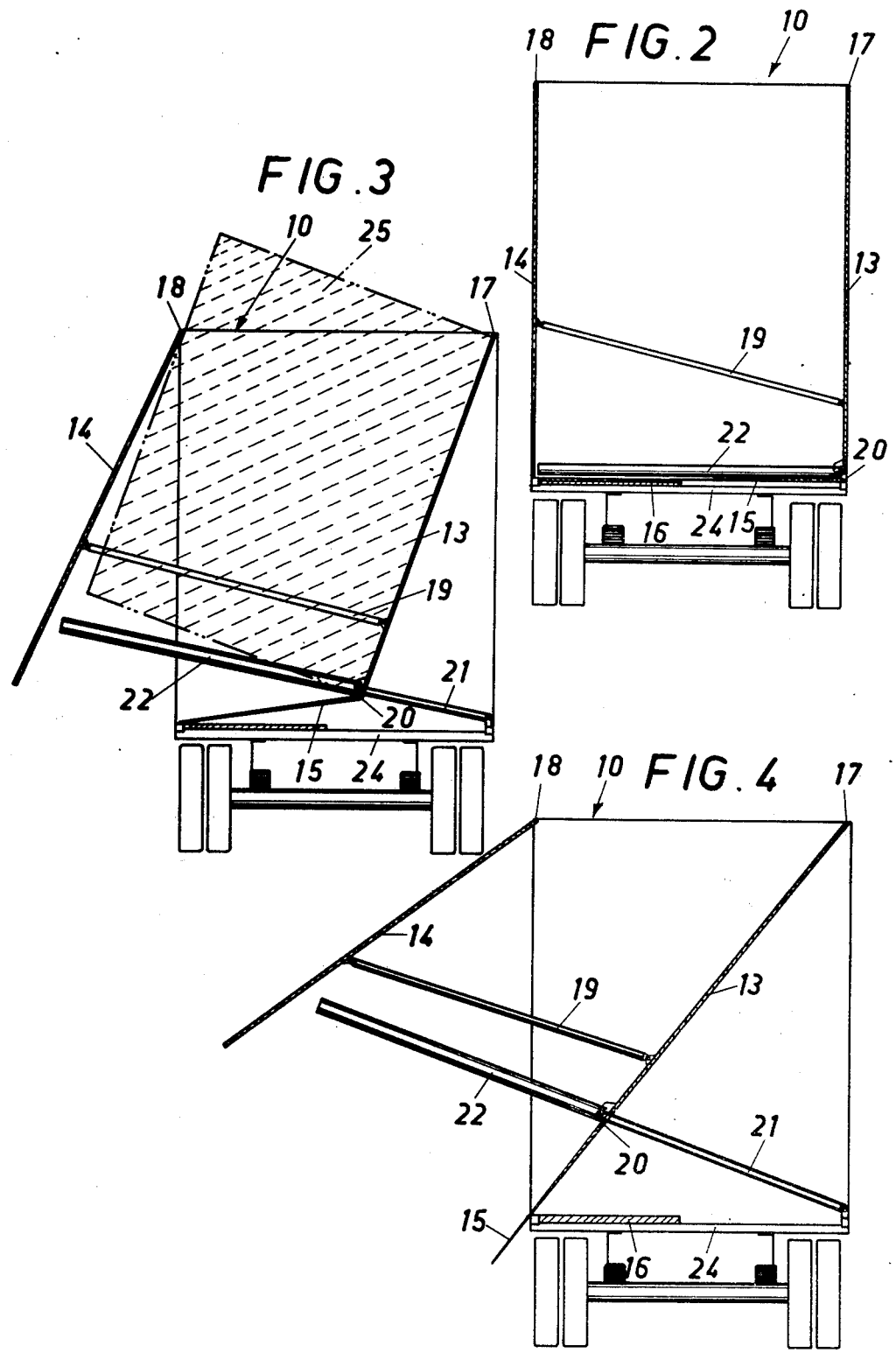

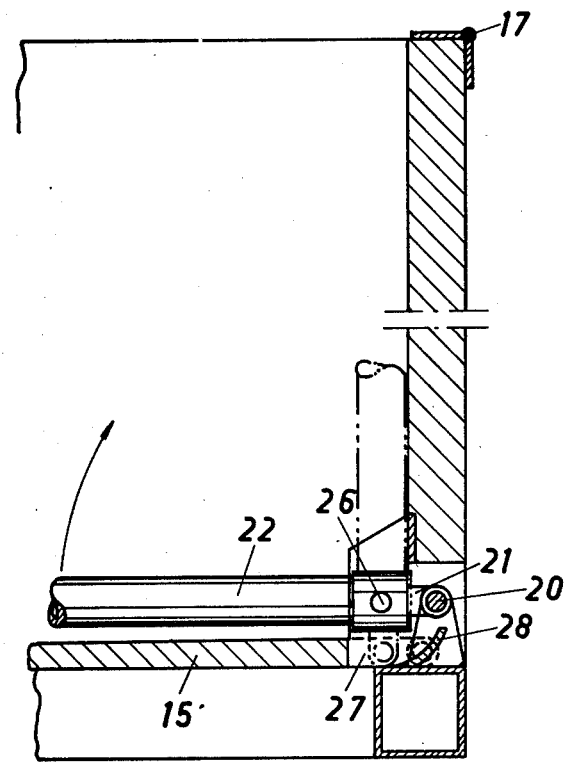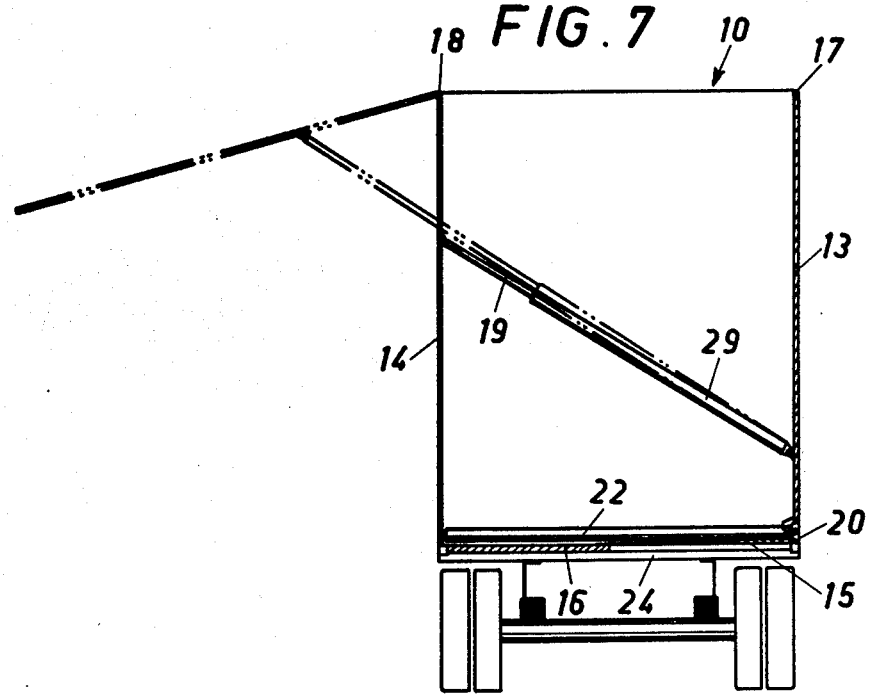

DEVICE FOR EMPTYING CONTAINERS OR SIMILAR

BACKGROUND OF THE INVENTION

The present invention refers to a device for emptying containers and similar e.g. on a truck, said container comprises a pair of side walls, which are situated just opposite each other and are pivotally mounted at their upper edges about upper hinges, a movable bottom plate which by means of a lower hinge is pivotally connected to the lower edge of the first side wall, and a fixed bottom plate, the device comprises means for pivoting the side walls about the upper hinges and displacing the movable bottom plate in relation to the fixed bottom plate.

Bulk material, e.g. wood chips, cutter shavings, bark and similar, filled in containers on trucks, has a tendency of being packed together during the transport, and thus the containers are difficult to empty in the conventional way, i.e. by being tipped backwards or sideways. The closely packed material remains in the container even if this is brought to incline considerably.

There are previously known a number of containers, which are emptied by simultaneously pivoting the two side walls and a movable bottom plate in one direction. The bottom plate is pivotally connected to one of the side walls, so that it will be aligned with said side wall in the emptying position, at which the material easily slips off. The pivoting movement can be achieved by means of a hydraulic jack or a wire arrangement.

The drawback with these previously known devices is that the pivoting means is so arranged, that the pushing side wall is subjected to considerable tensile forces. The upper hinge of the side wall therefore has to be made very strong in order to carry the great stresses, to which it is subjected.

The purpose of the invention is to avoid this drawback and to arrange the pivoting means so that it does not cause great stresses on the upper part of the container. The container can therefore be manufactured considerably simpler and cheaper. The stresses will instead be carried by the relatively strong bottom construction of the container.

SUMMARY OF THE INVENTION

According to the invention the pivoting means comprises at least one jack or similar, comprising two members being movable relative each other, the first member with its free end being pivotally attached to one of the side edges of the bottom of the container, and the second member being pivotally attached to the lower edge of the first side wall in such a way that the second member of the jack makes an obtuse angle with the first side wall when the side walls are pivoted to the emptying position, and that the side walls are connected to each other by means of at least one bar or similar.

BRIEF DESCRIPTION OF THE DRAWINGS

FIGS. 2-4 are sections through a container during different steps of the emptying operation.

FIG. 6 is a view corresponding to FIG. 5 but showing a somewhat modified embodiment, and FIG. 7 is a view corresponding to FIG. 2 but showing another embodiment of the bar.

DESCRIPTION OF SOME PREFERRED EMBODIMENTS

Figure 1:
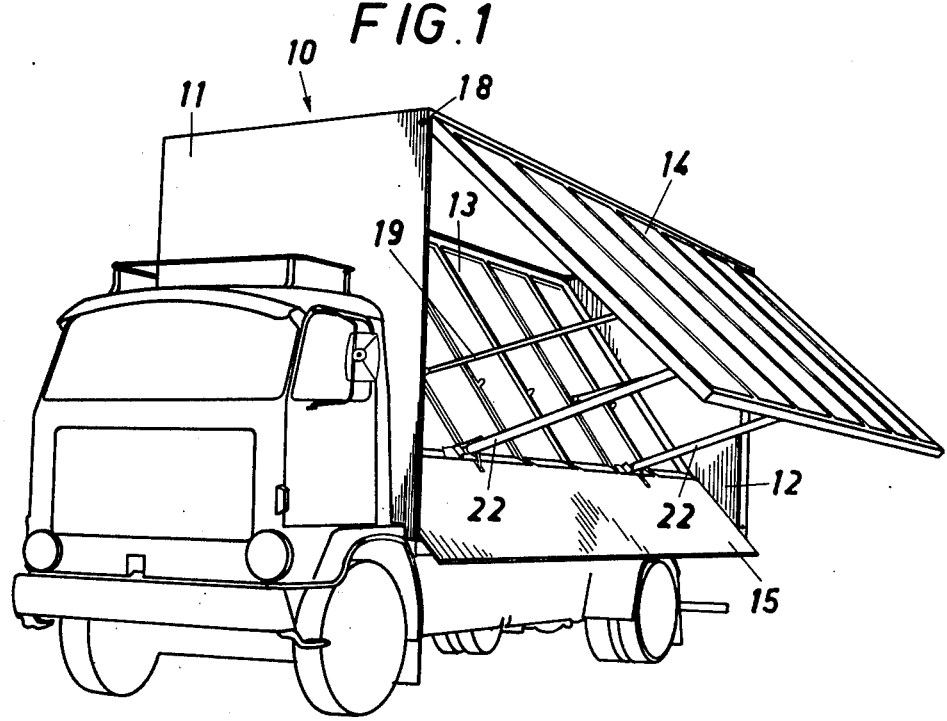
FIG. 1 is a perspective view of a truck, the container of which is in its emptying position.

In the drawings the numeral 10 denotes a container on a truck, said container comprises a front and a back wall 11 and 12 respectively, a first and a second side wall 13 and 14 respectively, a movable bottom plate 15 extending across about half the width of the container and a fixed bottom plate 16. The side walls 13 and 14 are pivotally mounted at their upper edges about upper hinges 17 and 18 respectively and are connected to each other by one or more parallel bars 19. The attachment of the bar 19 to the first side wall 13 is placed lower than the attachment to the second side wall 14, and when emptying the container 10 the first side wall 13 is pivoted inwards while the second side wall 14 is pivoted outwards and thus the side walls will diverge from each other, which can be seen in FIG. 4, to further facilitate emptying.

The movable bottom plate 15 is by means of a lower hinge 20 pivotably connected to the first side wall 13.

Figure 5:
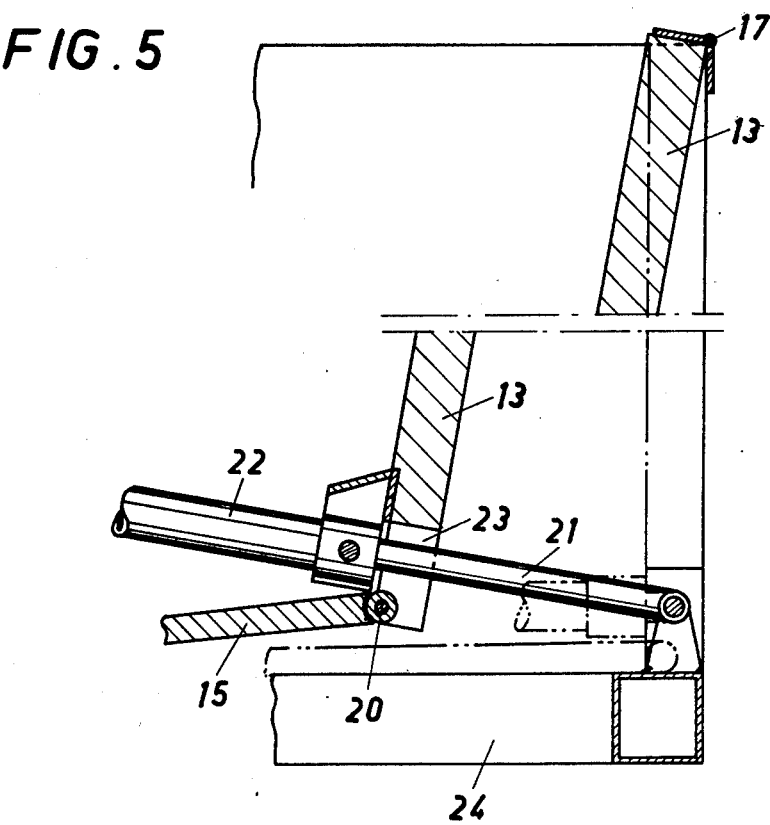
FIG. 5 shows on a larger scale the lower part of the side wall in a somewhat swung-out position and a part of the jack and the bottom of the container.

The pivoting movement of the side walls is achieved by means of one or more hydraulic jacks arranged across the container 10. The piston rod 21 of a jack is at its free end pivotally connected to the fixed bottom construction 24 near the lower edge of the first side wall 13. The cylinder 22 is at its end facing the piston rod 21 pivotally mounted about a pivot pin 26 inside the first side wall 13 at the lower edge thereof, at which the piston rod 21 extends through an aperture 23 in the side wall 13. When the piston rod 21 is completely telescoped in the cylinder 22 the attachment of the piston rod to the bottom construction 24 will be received in the aperture 23. The attachment means of the jack are clearly shown in FIG. 5.

When the side walls 13 and 14 are in the position shown in FIG. 2 the cylinder rests against the bottom of the container 10. When the piston rod 21 is pushed out the side walls 13 and 14 are simultaneously pivoted about their hinges 17 and 18 respectively to the left according to the Figures, i.e. the first side wall 13 is pivoted in towards the container 10. The movable bottom plate 15 is herewith displaced along the fixed bottom plate 16, and is at the same time pivoted about the hinge 20 and is in the position according to FIG. 4 aligned with the first side wall 13. The movable bottom plates 15 also serves as a stiffener of the side wall 13 during the emptying of the container, so that the construction can be made light but still strong.

By arranging the jack in the above described way, at which the angle between the cylinder 22 and the side wall 13 increases during the pivoting of the side walls to the emptying position, when the bulk material is so closely packed that it acts as an integral block (shown with dash dotted lines in FIG. 3) the jack will not extend into the block and is thus not subjected to a considerable pressure. Thereby also the tensile forces in the pushing side wall 13 are reduced to a minimum and the container does therefore not have to be made extra solid, heavy and expensive.

In order to as far as possible prevent the closely packed material keeping its shape it is important that the outer side wall 14 diverges in relation to the inner side wall 13. This is achieved in that the outer side of the material facing the side wall 14 looses its support and can be broken in pieces by its own weight and/or by pivoting the side walls to and fro.

In the embodiment according to FIG. 6 the end of the piston rod 21 is detachably mounted, so that the jack can be pivoted upwards about the pivot pin 26 of the cylinder 22. In order to make this movement possible an aperture 27 is provided in the hinge 20 and the movable bottom plate 15. A support 28 is arranged as a stop for the piston rod 21. When the jacks are in an upright position the whole bottom surface of the container 10 is disposable for loading.

In the embodiment according to FIG. 7 the bar 19 is provided with a jack 29, which is operated separately and is e.g. hydraulically or pneumatically driven. The second side wall 14 can by that be opened and closed independently of the rest of the system. Thus the whole cargo space can be exposed for loading and unloading from in this case the left side.

The invention is not limited to the embodiments shown but can be varied within the scope of the claims.

Thus the jack can also comprise a manually operatable or motor-driven mechanical power machine, where the piston rod 21 is replaced by a rotatable spindle and the cylinder by a barrel nut. It is further possible to arrange the jacks outside the end walls or inside protective housings instead of inside the end walls, at which guides at the lower corner portions of the side wall 13 extend through recesses in the end walls or the protective housings respectively.

What I claim is:

1. A device for emptying a container, said container comprising a pair of side walls which are situated opposite each other and which are pivotally mounted at their upper edges about upper hinges, a bottom wall including a fixed bottom plate and a movable bottom plate pivotally connected by a lower hinge to the lower edge of one of said side walls, and a fixed bottom construction, said device comprising means for pivoting the side walls about the upper hinges and displacing the movable bottom plate in relation to the fixed bottom plate, wherein said means comprises at least one jacking means having two members movable relative to each other, a first of said members having an end pivotally attached to a side edges of the bottom construction of the container, and the second member being pivotally attached to said one of said side walls and the device further includes at least one elongated member connecting the side walls to each other.

2. A device according to claim 1, wherein the jacking means comprises a hydraulically or pneumatically driven piston and cylinder having a piston rod and wherein said rod is pivotally attached to the bottom construction of the container and the piston rod end of the cylinder is pivotally mounted to the lower edge of the first side wall, whereby the cylinder defines an obtuse angle with the first side wall when the side walls are pivoted to an emptying position.

3. A device according to claim 1, wherein said elongated member is attached to the first side wall at a lower level than it is attached to the second side wall.